United States Patent
Harikae

(10) Patent No.: US 8,225,835 B2
(45) Date of Patent: Jul. 24, 2012

(54) PNEUMATIC RADIAL TIRE

(75) Inventor: Shinya Harikae, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 366 days.

(21) Appl. No.: 12/517,498

(22) PCT Filed: Dec. 4, 2007

(86) PCT No.: PCT/JP2007/073357
§ 371 (c)(1), (2), (4) Date: Jun. 3, 2009

(87) PCT Pub. No.: WO2008/090680
PCT Pub. Date: Jul. 31, 2008

(65) Prior Publication Data
US 2010/0024944 A1 Feb. 4, 2010

(30) Foreign Application Priority Data
Jan. 23, 2007 (JP) ................... 2007-013085

(51) Int. Cl.
*B60C 9/22* (2006.01)
*B60C 9/20* (2006.01)
*B60C 9/18* (2006.01)

(52) U.S. Cl. ......... 152/536; 152/531; 152/527; 152/532

(58) Field of Classification Search ............ 151/531, 151/536; *B60C 9/22*
See application file for complete search history.

(56) References Cited

U.S. PATENT DOCUMENTS

| | | | |
|---|---|---|---|
| 5,738,740 A | 4/1998 | Cluzel | |
| 5,746,853 A | 5/1998 | Burlacot | |
| 5,772,810 A | 6/1998 | Cluzel | |
| 6,315,019 B1 * | 11/2001 | Garlaschelli et al. | 152/527 |
| 6,695,026 B2 * | 2/2004 | Miyazaki et al. | 152/527 |
| 2002/0033213 A1 | 3/2002 | Cluzel | |
| 2006/0169380 A1 | 8/2006 | Radulescu et al. | |

FOREIGN PATENT DOCUMENTS

JP   A 6-191219   7/1994

(Continued)

*Primary Examiner* — Justin Fischer
*Assistant Examiner* — Philip N Schwartz
(74) *Attorney, Agent, or Firm* — Greer, Burns & Crain, Ltd.

(57) ABSTRACT

Provided is a pneumatic radial tire: that includes a circumferential-direction reinforcement layer having a width increased with fatigue break of the circumferential-direction reinforcement layer being suppressed at edge portions thereof; and that suppresses separation in each of cross belt layers at edge portions thereof. A pneumatic radial tire according to the present invention is a pneumatic tire including: at least two cross belt layers disposed on an outer circumferential side of a carcass layer in a tread portion; and at least one circumferential-direction reinforcement layer disposed between these cross belt layers, a width of the circumferential-direction reinforcement layer being smaller than that of each cross belt layer. The pneumatic radial tire is configured so that: the cross belt layers are separated away from each other at outer sides respectively of end positions, in a width direction, of the circumferential-direction reinforcement layer; the circumferential-direction reinforcement layer includes steel cords of two types which differ in elongation at break; and the steel cord having relatively small elongation at break is disposed in a center portion of the circumferential-direction reinforcement layer, whereas the steel cord having relatively large elongation at break is disposed in each of outer side portions of the circumferential-direction reinforcement layer.

9 Claims, 2 Drawing Sheets

FOREIGN PATENT DOCUMENTS

| JP | A 8-132821 | 5/1996 |
| JP | A 9-183302 | 7/1997 |
| JP | A 9-512226 | 12/1997 |
| JP | A 11-502166 | 2/1999 |
| JP | A 2001-522748 | 11/2001 |
| JP | A 2002-544044 | 12/2002 |
| JP | A 2006-528105 | 12/2006 |

* cited by examiner

PNEUMATIC RADIAL TIRE

This application is a U.S. National Phase under 35 U.S.C. §371 of International Application No. PCT/JP2007/073357, filed Dec. 4, 2007.

TECHNICAL FIELD

The present invention relates to a pneumatic radial tire with an aspect ratio of 60% or less, which is suitable as a heavy-duty tire. Specifically, the present invention relates to a pneumatic radial tire: that includes a circumferential-direction reinforcement layer having a width increased with fatigue break of the circumferential-direction reinforcement layer being suppressed at edge portions thereof; and that suppresses separation in each of cross belt layers at edge portions thereof.

BACKGROUND ART

These years, a growing number of trucks and buses use heavy-duty tires that employ a single tire installation with a low-profile structure for the purpose of reducing fuel consumption and saving natural resources. The most widely employed practice for tires each with an aspect ratio of 60% or less is to dispose a circumferential-direction reinforcement layer, whose cord angle to the circumferential direction of the tire is substantially 0 degrees, between cross belt layers (see Patent Document 1, for example). In such a belt structure, a tension of each cord in each edge portion of the circumferential-direction reinforcement layer is high. For this reason, the cords in each edge portion of the circumferential-direction reinforcement layer tend to break due to their fatigue. To avoid this, the cross belt layers are formed larger in width than the circumferential-direction reinforcement layer, and laminated to be in direct contact with each other at outer sides, in the width direction, of the circumferential-direction reinforcement layer. The cross belt layers work at the outer sides, in the width direction, of the circumferential-direction reinforcement layer so as to reduce the tension of each cord in each edge portion of the circumferential-direction reinforcement layer. This tension reduction consequently suppresses the fatigue break of the cords.

However, in the case where the cross belt layers are formed larger in width than the circumferential-direction reinforcement layer, and where such cross belt layers are laminated to be in direct contact with each other at outer sides, in the width direction, of the circumferential-direction reinforcement layer, the total width of the circumferential-direction reinforcement layer is restricted. As a result, the circumferential-direction reinforcement layer does not always bring a sufficient effect of improving the high-speed durability of the tire. In addition, because the cross belt layers are laminated to be in direct contact with each other at the outer sides, in the width direction, of the circumferential-direction reinforcement layer, the shear strain which each cross belt layer receives is large. As a result, the cords and a rubber portion tend to be separated from one another in each edge portion of the cross belt layer.

Patent Document 1: Japanese patent application Kokai publication No. 2001-522748

DISCLOSURE OF THE INVENTION

Problem to be Solved by the Invention

An object of the present invention is to provide a pneumatic radial tire: that includes a circumferential-direction reinforcement layer having a width increased with fatigue break of the circumferential-direction reinforcement layer being suppressed at edge portions thereof; and that suppresses separation in each of cross belt layers at edge portions thereof.

Means for Solving the Problem

A pneumatic radial tire according to the present invention made for the purpose of achieving the object is a pneumatic tire including: at least two cross belt layers disposed on an outer circumferential side of a carcass layer in a tread portion; and at least one circumferential-direction reinforcement layer disposed between these cross belt layers, a width of the circumferential-direction reinforcement layer being smaller than that of each cross belt layer. The pneumatic radial tire is characterized in that: the cross belt layers are separated away from each other at outer sides respectively of end positions, in a width direction, of the circumferential-direction reinforcement layer; the circumferential-direction reinforcement layer includes steel cords of two types which differ in elongation at break; and the steel cord having relatively small elongation at break is disposed in a center portion of the circumferential-direction reinforcement layer, whereas the steel cord having relatively large elongation at break is disposed in each of outer side portions of the circumferential-direction reinforcement layer.

Effects of the Invention

The inventors of the present invention conducted an earnest study, based on durability tests, on a pneumatic radial tire including at least two cross belt layers which are disposed on an outer circumferential side of the carcass layer in a tread portion, and at least one circumferential-direction reinforcement layer disposed between these cross belt layers, the width of the circumferential-direction reinforcement layer being smaller than that of each cross belt layer. It was observed that the cords in each edge portion of the circumferential-direction reinforcement layer tend to break. With this taken into consideration, the inventors have found an optimal structure for suppressing fatigue break of each edge portion of the circumferential-direction reinforcement layer, and developed the findings into the present invention.

In the present invention, the circumferential-direction reinforcement layer includes the steel cords of the two types which differ in elongation at break. The steel cord having relatively small elongation at break is disposed in the center portion of the circumferential-direction reinforcement layer, whereas the steel cord having relatively large elongation at break is disposed in each of the outer side portions of the circumferential-direction reinforcement layer. By this, the present invention enables a width increase for the circumferential-direction reinforcement layer, as well as suppression of fatigue break of the edge portions of the circumferential-direction reinforcement layer. Consequently, the present invention makes it possible to enhance the effect of improving the high-speed durability of the tire on the basis of the circumferential-direction reinforcement layer. Furthermore, the cross belt layers are separated away from each other at the outer sides respectively of end positions, in the width direction, of the circumferential-direction reinforcement layer. With this separation, the present invention is capable of reducing the shear strain in each edge portion of the cross belt layers, and is thus capable of suppressing the separation in the edge portion. Thereby, the present invention makes it possible to improve the load durability of the tire.

In the present invention, it is desirable that each steel cord disposed in the center portion of the circumferential-direction reinforcement layer should have an m×n structure where the direction of the first twist of filaments of the steel cord coincides with the direction of the second twist of the filaments, the elongation at break of the steel cord being 3% or more. In addition, it is desirable that the steel cord disposed in each of the outer side portions of the circumferential-direction reinforcement layer should have filaments which are preformed into a zigzag shape, and the elongation at break of the steel cord is 6% or more. In particular, it is desirable that the difference between the elongation at break of the steel cord disposed in each of the outer side portions of the circumferential-direction reinforcement layer and the elongation at break of the steel cord disposed in the center portion of the circumferential-direction reinforcement layer should be 1.5% or more. Moreover, it is desirable that the ratio of the total width of the circumferential-direction reinforcement layer to the maximum width of the cross belt layers should be 65% to 95%. It is desirable that the ratio of the width of the center portion of the circumferential-direction reinforcement layer to the total width of the circumferential-direction reinforcement layer should be 40% to 85%. When these conditions are satisfied, the present invention is capable of achieving the high-speed durability and load durability of the tire at the same time, at high levels.

The present invention can be applied to various pneumatic radial tires. It is desirable that the present invention should be applied to pneumatic radial tires each with an aspect ratio of 60% or less. In particular in a case where the present invention is applied to heavy-duty pneumatic radial tires, the present invention brings about a remarkable operation and effect.

Figure 1:
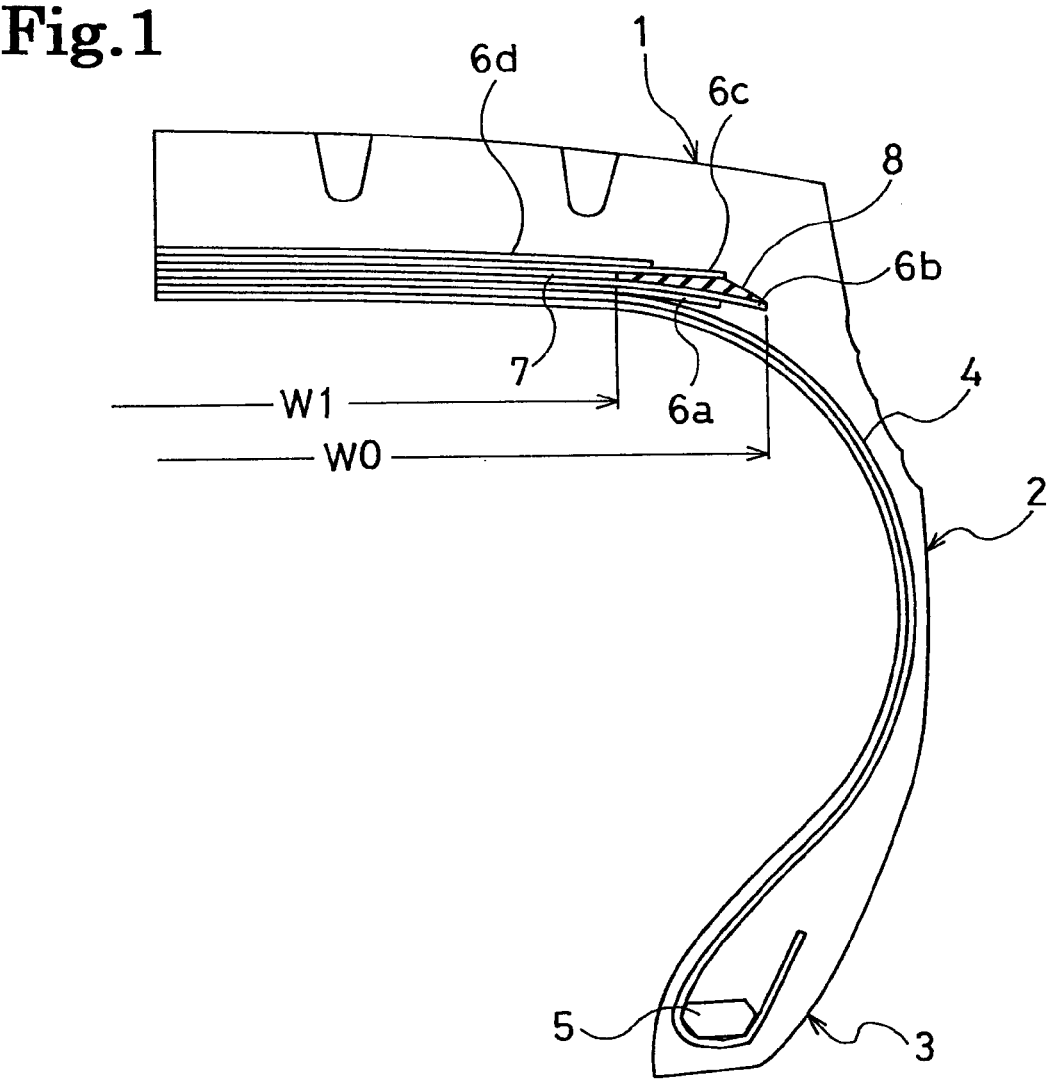
FIG. 1 is a meridian half cross-sectional view showing a heavy-duty pneumatic radial tire according to an embodiment of the present invention.

| EXPLANATION OF REFERENCE NUMERALS | |
|---|---|
| 1 | tread portion |
| 2 | sidewall portion |
| 3 | bead portion |
| 4 | carcass layer |
| 5 | bead core |
| 6a | higher-angle belt layer |
| 6b, 6c | cross belt layer |
| 6d | protective belt layer |
| 7 | circumferential-direction reinforcement layer |
| 8 | belt-edge cushion rubber layer |

BEST MODE FOR CARRYING OUT THE INVENTION

Figure 2:
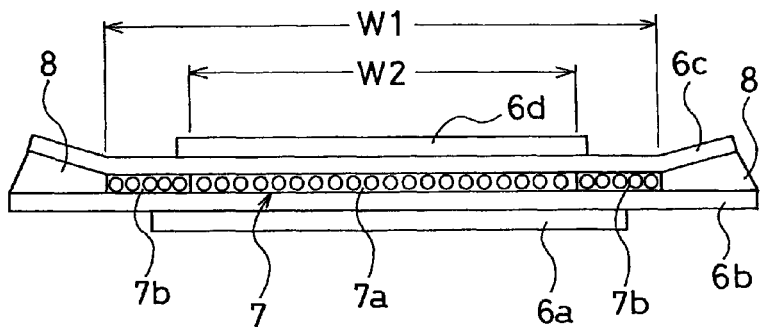
FIG. 2 is a cross-sectional view schematically showing a belt structure body in the pneumatic radial tire shown in FIG. 1.

Detailed descriptions will be hereinbelow provided for a configuration of the present invention by referring to the attached drawings. FIG. 1 shows a heavy-duty pneumatic radial tire according to an embodiment of the present invention. FIG. 2 schematically shows a belt structure body of the heavy-duty pneumatic radial tire. In FIG. 1, reference numeral 1 denotes a tread portion; 2, a sidewall portion; and 3, a bead portion. A carcass layer 4 is laid between paired right and left bead portions 3. An end portion of the carcass layer 4 is wound around each bead core 5 from the inner side to the outer side of the tire. In the tread portion 1, belt layers 6a to 6d are disposed on an outer circumferential side of the carcass layer 4 in such a way as to extend throughout the circumference of the tire. Each of these belt layers 6a to 6d includes multiple steel cords which tilt relative to the circumferential direction of the tire. The belt layer 6a disposed closest to the carcass layer 4 is termed as a large-angle belt layer. The belt layers 6b and 6c disposed on an outer circumferential side of the belt layer 6a are termed as cross belt layers. The belt layer 6d disposed on an outer circumferential side of the belt layer 6c is termed as a protective belt layer.

In the large-angle belt layer 6a, a cord angle to the circumferential direction of the tire is 45 degrees to 90 degrees. The large-angle belt layer 6a aims at increasing the rigidity of the belt structure body against outward bending of its surface, and accordingly aims at preventing the tread portion 1 from buckling. When the cord angle of the large-angle belt layer 6a is smaller than the lower limit value, the effect of improving the rigidity of the belt structure body against outward bending of its surface is reduced.

In each of the cross belt layers 6b and 6c, a cord angle to the circumferential direction of the tire is 10 degrees to 45 degrees. These cross belt layers 6b and 6c are disposed in a way that the cords of the cross belt layer 6b cross over the cords of the cross belt layer 6c. Consequently, the cross belt layers 6b and 6c exhibit a higher rigidity because the cords of the cross belt layer 6B and the cords of the cross belt layer 6C check each other's movement. When the cord angles of the cross belt layers 6b and 6c deviates from the above-mentioned range, the cross belt layers 6b and 6c cannot fully exhibit the properties requested as the belt structure body.

In the protective belt layer 6d, a cord angle to the circumferential direction of the tire is 10 degrees to 45 degrees. The protective belt layer 6d aims at protecting the belt structure body from external damages. When the cord angle of the protective belt layer 6d deviates from the above-mentioned range, the effect of protecting the belt structure body is reduced.

A circumferential-direction reinforcement layer 7 has a width smaller than that of each of the cross belt layers 6b and 6c, and is disposed between the cross belt layers 6b and 6c. At an outer side of each end position, in the width direction, of the circumferential-direction reinforcement layer 7, the cross belt layers 6b and 6c are separated away from each other. A belt-edge cushion rubber layer 8 is inserted between each of the edge portions of the cross belt layer 6b and its corresponding one of the edge portions of the cross belt layer 6c.

In the circumferential-direction reinforcement layer 7, a cord angle to the circumferential direction of the tire is 0 degrees to 5 degrees. The total width W1 of the circumferential-direction reinforcement layer 7 is set in a range of 65% to 95% of the maximum width W0 of the cross belt layers 6b and 6c. Among the belt structure body, this circumferential-direction reinforcement layer 7 aims at withholding a tension in the circumferential direction of the tire. When the cord angle of the circumferential-direction reinforcement layer 7 is larger than the upper limit value, the internal-pressure holding capability of the tire is reduced. Meanwhile, when the total width W1 of the circumferential-direction reinforcement layer 7 is smaller than the lower limit value, the belt structure body's capability of withholding the tension in the circumferential direction of the tire becomes insufficient. On the contrary, when the total width W1 is larger than the upper limit value, edge portions of the circumferential-direction reinforcement layer 7 tend to break due to its fatigue.

The circumferential-direction reinforcement layer 7 is configured of steel cords of two types which differ in elongation at break. Steel cords having relatively small elongation at break are disposed in a center portion 7a of the circumferential-direction reinforcement layer 7, whereas steel cords having relatively large elongation at break are disposed in each of outer side portions 7b and 7b of the circumferential-direction reinforcement layer 7.

More specifically, each steel cord disposed in the center portion 7a of the circumferential-direction reinforcement layer 7 has an m×n structure: in which m (m≠1) first-twisted cords are second-twisted, m first-twisted cords each obtained by first-twisting n (n≠1) filaments; and in which the direction of the first twist and the direction of the second twist coincide with each other. In addition, each steel cord disposed in the center portion 7a has such property that the elongation at break of the steel cord is not less than 3%, and preferably 3% to 6%, when the steel cord is taken out of the tire. When the elongation at break of each steel cord disposed in the center portion 7a is smaller than the lower limit value, the lower elongation at break makes it difficult for the cord to change in shape while the tire is being cured.

On the other hand, each steel cord disposed in each of the outer side portions 7b and 7b of the circumferential-direction reinforcement layer 7 has a 1×N structure in which, for example, the steel cord is obtained by twisting N (N≠1) filaments together. The filaments are preformed into a helical shape for the purpose of twisting the filaments together. In addition, the filaments are preformed into a zigzag shape by gear processing or the like.

Figure 3:
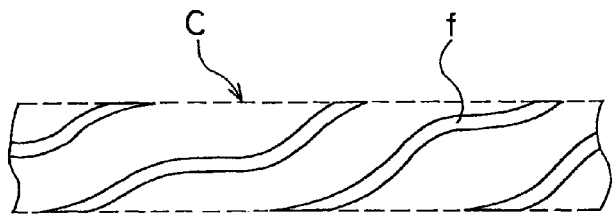
FIG. 3 is a plan view illustrating a steel cord with a larger elongation at break, which is disposed at each of outer side portions of a circumferential-direction reinforcement layer.

FIG. 3 shows an example of each steel cord that is disposed in each of the outer side portions of the circumferential-direction reinforcement layer, and that has relatively large elongation at break. As shown in FIG. 3, each filament f included in a steel cord C with the 1×N structure is preformed in the helical and zigzag shapes. As compared to each steel cord with the m×n structure, each steel cord preformed in the zigzag shape is characterized in that the steel cord is high in the initial elasticity, low in the terminal elasticity, and large in the elongation at break. In addition, each steel cord disposed in each of the outer side portions 7b and 7b has such properties that the elongation at break of the steel cord is not less than 6%, and preferably 6% to 9%, when the steel cord is taken out of the tire. When the elongation at break of each steel cord disposed in each of the outer side portions 7b and 7b is smaller than the lower limit value, the edge portions of the circumferential-direction reinforcement layer 7 tend to break due to their fatigue.

Figure 4:
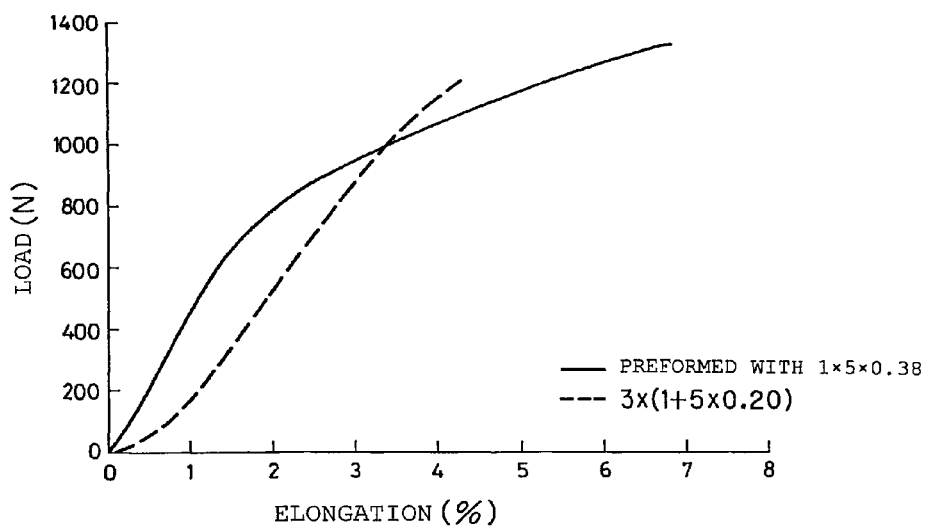
FIG. 4 is a graph showing elongation property of a steel cord with an m×n structure and elongation property of a steel cord with a 1×N structure in which filaments are preformed into a zigzag shape.

FIG. 4 is a graph showing the elongation property of a steel cord which has the m×n structure, and the elongation property of a steel cord which has the zigzag preformed filaments and the 1×N structure. As shown in FIG. 4, compared to the steel cord with 3×(1+5×0.20) structure, the preformed steel cord with a 1×5×0.38 structure is large in the initial elasticity, small in the terminal elasticity, and large in the elongation at break.

The difference between the elongation at break of each steel cord disposed in the center portion 7a of the circumferential-direction reinforcement layer 7 and the elongation at break of each steel cord disposed in each of the outer side portions 7b and 7b of the circumferential-direction reinforcement layer 7 is not less than 1.5%, and preferably 1.5% to 3%. When the difference between the two elongations at break is less than 1.5%, the effect of preventing the fatigue break of each of the edge portions of the circumferential-direction reinforcement layer 7 is reduced.

Furthermore, a shown in FIG. 2, it is desirable that the ratio (W2/W1×100%) of the width W2 of the center portion 7a to the total width W1 of the circumferential-direction reinforcement layer 7 should be 40% to 85%. If the ratio is less than 40%, and concurrently if some of the steel cords having relatively large elongation at break are disposed in the tread center region, the tensile strain of the steel cords disposed in the tread center region becomes too small when the tire is inflated. For this reason, the steel cords disposed in the tread center region become more susceptible to compressive strain when a portion of the tire including the steel cords makes contact with a ground. As a result, the steel cords located in the tread center region tend to break due to their fatigue. On the other hand, if the ratio is higher than 85%, each edge portions of the center portion 7a of the circumferential-direction reinforcement layer 7 tends to break due to its fatigue.

In the case of the above-described pneumatic radial tire, the circumferential-direction reinforcement layer 7 is configured of steel cords of two types which differ in elongation at break. In addition, the steel cords having relatively small elongation at break are disposed in the center portion 7a, whereas the steel cords having relatively large elongation at break are disposed in each of the outer side portions 7b and 7b. Thus, the circumferential-direction reinforcement layer 7 can have a width increased with the fatigue break of the circumferential-direction reinforcement layer 7 being suppressed at the edge portions thereof. Consequently, the effect of improving the high-speed durability of the tire on the basis of the circumferential-direction reinforcement layer 7 can be enhanced. Moreover, portions of the respective cross belt layers 6b and 6c are separated away from each other at the outer side beyond each end position, in the width direction, of the circumferential-direction reinforcement layer 7. For this reason, the shear strain of each edge portion of each of the cross belt layers 6b and 6c can be eased. Thus, separation in each of the cross belt layers 6b and 6c is suppressed at the edge portions thereof. Consequently, the load durability of the tire can be enhanced. This operation and effect is remarkable particularly in a case of a heavy-duty pneumatic radial tire with an aspect ratio of 60% or less.

The foregoing descriptions have been provided for the embodiment in which the pneumatic radial tire includes the two cross belt layers and the single circumferential-direction reinforcement layer. Nevertheless, the number of cross belt layers and of circumferential-direction reinforcement layers can be increased depending on the necessity.

The foregoing detailed descriptions have been provided for the preferable embodiment of the present invention. Nevertheless, it should be understood that the embodiment can be variously modified, substituted and replaced without departing from the spirit and scope of the present invention defined by the scope of the attached claims.

EXAMPLES

For each of Examples 1 to 4, a pneumatic radial tire was produced with the following specification. The tire size was 435/45R22.5. Two cross belt layers were disposed on the outer circumferential side of the carcass layer in the tread portion. One circumferential-direction reinforcement layer was disposed between these cross belt layers, and the width of the circumferential-direction reinforcement layer was smaller than the width of each of the cross belt layers. The cross belt layers were separated away from each other at the outer sides of the respective end positions, in the width direction, of the circumferential-direction reinforcement layer. The circumferential-direction reinforcement layer was configured of steel cords of two types which differ in elongation at break. The steel cords having relatively small elongation at break were disposed in the center portion of the circumferential-direction reinforcement layer, whereas the steel cords having relatively large elongation at break were disposed in each of the outer side portions of the circumferential-direction reinforcement layer. In addition, the ratio (W1/W0× 100%) of the total width W1 of the circumferential-direction reinforcement layer to the maximum width W of the cross belt layers and the ratio (W2/W1×100%) of the width of the center portion to the total width W1 of the circumferential-direction reinforcement layer were changed among Examples 1 to 4.

For the comparison purposes, the other tires were respectively prepared for Conventional Example and Comparative Examples 1 to 2 as follows. In the tire of Conventional Example, the cross belt layers were laminated in such a way as to be directly contact with each other at outer sides beyond the respective end positions, in the width direction, of the circumferential-direction reinforcement layer, and the circumferential-direction reinforcement layer was configured of steel cords of a single type. In each of the tires of Comparative Examples 1 to 2, the cross belt layers were separated away from each other at the outer side of the respective end positions, in the width direction, of the circumferential-direction reinforcement layer, and the circumferential-direction reinforcement layer was configured of steel cords of a single type.

For each of these test tires, the load durability and high-speed durability were evaluated in accordance with the following test methods. The result of the evaluation is shown in Table 1.

Load Durability:

The test tires were mounted on the wheels of a rim size of 22.5×14.00, and were inflated with an air pressure of 900 kPa. The resultant test tires were attached to a drum test machine. Subsequently, a running test was performed on each test tire under the conditions of a speed of 45 km/h and a load of 68.65 kN. The distance that each test tire traveled until the test tire broke was measured. The result of the evaluation is indicated by indices where the result of Conventional Example is taken as an index of 100. The larger the index is, the more excellent the load durability was.

High-Speed Durability:

The test tires were mounted on the wheels of a rim size of 22.5×14.00, and were inflated with an air pressure of 900 kPa. The resultant test tires were attached to the drum test machine. Subsequently, a running test was performed on each test tire for 60 minutes under the conditions of a speed of 60 km/h and a load of 34.3 kN. Thereafter, the running test continued but with a speed which increased by 10 km/h for every 60 minutes. For each test tire, the distance that the test tire traveled until the test tire broke was measured. The result of the evaluation is indicated by indices where the result of Conventional Example is taken as an index of 100. The larger the index is, the more excellent the high-speed durability was.

The breakage modes which each test tire showed during each of the load durability test and the high-speed durability test were classified into the following three types A, B, C. A represents a breakage mode in which separation occurred in the edge portions of the cross belt layers. B represents a breakage mode in which edge separation was occurred in the edge portions of the cross belt layers due to fatigue break at the respective edge portions of the circumferential-direction reinforcement layer. C represents a breakage mode in which separation was occurred in the cross belt layers due to fatigue break in circumferential-direction reinforcement layer in the tread center region.

TABLE 1

|  |  | Conventional Example | Comparative Example 1 | Example 1 | Example 2 | Example 3 | Example 4 | Comparative Example 2 |
|---|---|---|---|---|---|---|---|---|
| W1/W0 × 100% |  | 75 | 85 | 85 | 85 | 85 | 85 | 85 |
| W2/W1 × 100% |  | 100 | 100 | 80 | 90 | 50 | 30 | 100 |
| Center Portion of Circumferential-Direction Reinforcement Layer | Cord Structure | 3*(1 + 5)*0.20 | 3*(1 + 5)*0.20 | 3*(1 + 5)*0.20 | 3*(1 + 5)*0.20 | 3*(1 + 5)*0.20 | 3*(1 + 5)*0.20 | Preformed with 1*5*0.38 |
|  | Cord Cross-Sectional Area (mm²) | 0.565 | 0.565 | 0.565 | 0.565 | 0.565 | 0.565 | 0.567 |
|  | Cord Elongation at Break (%) | 4.2 | 4.2 | 4.2 | 4.2 | 4.2 | 4.2 | 6.8 |
| Two Outer Side Portions of Circumferential-Direction Reinforcement Layer | Cord Structure | — | — | Preformed with 1*5*0.38 | Preformed with 1*5*0.38 | Preformed with 1*5*0.38 | Preformed with 1*5*0.38 | — |
|  | Cord Cross-Sectional Area (mm²) | — | — | 0.567 | 0.567 | 0.567 | 0.567 | — |
|  | Cord Elongation at Break (%) | — | — | 6.8 | 6.8 | 6.8 | 6.8 | — |
| Performance of Tire | Load Durability | 100 | 80 | 105 | 102 | 105 | 102 | 95 |
|  | Breakage Mode | A | B | A | A | A | C | C |
|  | High-Speed Durability | 100 | 110 | 115 | 105 | 115 | 115 | 115 |
|  | Breakage Mode | A | A | A | A | A | A | A |

As shown in Table 1, the tire of each of Examples 1 to exhibited better load durability and high-speed durability than the tire of Conventional Example. The tire of each of Comparative Examples 1 and 2 exhibited a better high-speed durability, but exhibited a worse load durability than the tire of Conventional Example. In particular, the tire of Comparative Example 1 suffered breakage in the edge portions of the circumferential-direction reinforcement layer due to its fatigue. The tire of Comparative Example 2 suffered breakage in a portion of the circumferential-direction reinforcement layer in the tread center region due to its fatigue.

What is claimed is:

1. A pneumatic radial tire including:
at least two cross belt layers disposed on an outer circumferential side of a carcass layer in a tread portion; and
at least one circumferential-direction reinforcement layer disposed between these cross belt layers, a width of the circumferential-direction reinforcement layer being smaller than that of each cross belt layer,
the pneumatic radial tire wherein,
the cross belt layers are separated away from each other at outer sides respectively of end positions, in a width direction, of the circumferential-direction reinforcement layer,
the circumferential-direction reinforcement layer includes steel cords of two types which differ in elongation at break, and
the steel cord having relatively small elongation at break is disposed in a center portion of the circumferential-direction reinforcement layer, whereas the steel cord having relatively large elongation at break is disposed in each of outer side portions of the circumferential-direction reinforcement layer,
wherein the steel cord disposed in the center portion of the circumferential-direction reinforcement layer has an m×n structure in which a direction of a first twist of filaments of the steel cord coincides with a direction of a second twist of the filaments, the steel cord having elongation at break of not less than 3%, and
the steel cord disposed in each of the outer side portions of the circumferential-direction reinforcement layer has filaments which are preformed into a zigzag shape, the steel cord having elongation at break of not less than 6%.

2. The pneumatic radial tire according to claim 1, wherein a difference between the elongation at break of the steel cord disposed in the center portion of the circumferential-direction reinforcement layer and the elongation at break of the steel cord disposed in each of the outer side portions of the circumferential-direction reinforcement layer is not less than 1.5%.

3. The pneumatic radial tire according to claim 1 or claim 2, wherein a ratio of a total width of the circumferential-direction reinforcement layer to a maximum width of the cross belt layers is 65% to 95%.

4. The pneumatic radial tire according to claim 1 or claim 2, wherein a ratio of a width of the center portion of the circumferential-direction reinforcement layer to the total width of the circumferential-direction reinforcement layer is 40% to 85%.

5. The pneumatic radial tire according to claim 1 or claim 2, wherein an aspect ratio is not more than 60%.

6. The pneumatic radial tire according to claim 1 or claim 2, wherein the elongation at break of the steel cord disposed in the center portion is between 3% and 6%.

7. The pneumatic radial tire according to claim 1 or claim 2, wherein the elongation at break of the steel cords disposed in each of the outer side portions is between 6% and 9%.

8. The pneumatic radial tire according to claim 1 or claim 2, wherein the difference between the elongation at break of each steel cord disposed in the center portion of the circumferential-direction reinforcement layer and the elongation at break of each steel cord disposed in each of the outer side portions of the circumferential-direction reinforcement layer is between 1.5% and 3%.

9. The pneumatic radial tire according to claim 1 or claim 2, wherein a belt-edge cushion rubber layer is inserted between the edge portions, in the width direction, of the cross belt layers.

* * * * *